United States Patent [19]

Stanton et al.

[11] 4,392,100
[45] Jul. 5, 1983

[54] OPTIMUM EFFICIENCY CONTROL SYSTEM

[75] Inventors: William E. Stanton, Newton; David B. Eisenhaure, Hull; Robert D. Drescher, Cambridge, all of Mass.

[73] Assignee: The Charles Stark Draper Laboratory, Inc., Cambridge, Mass.

[21] Appl. No.: 174,552

[22] Filed: Aug. 1, 1980

[51] Int. Cl.³ .............................................. H02P 5/40
[52] U.S. Cl. .................................... 318/803; 318/808; 318/811
[58] Field of Search ......................... 318/803, 807–811

[56] References Cited

U.S. PATENT DOCUMENTS

| | | | |
|---|---|---|---|
| 3,838,322 | 9/1974 | Greenwell | 318/810 |
| 3,983,463 | 9/1976 | Nabae et al. | 318/803 |
| 4,263,542 | 4/1981 | Schulze et al. | 318/807 |
| 4,276,505 | 6/1981 | Bose | 318/809 |
| 4,281,276 | 7/1981 | Cutler et al. | 318/803 |

OTHER PUBLICATIONS

Murphy, J. M. D., *Thyristor Control of AC Motors*, Pergamon Press, 1973, pp. 111–114, 120–130.

*Primary Examiner*—David Smith, Jr.

[57] ABSTRACT

An optimum efficiency control system for a variable torque/speed rotary a.c. induction machine including means for varying the frequency and magnitude of the excitation voltage/current supplied to the machine in three optimum efficiency regions of operation, a first fixed slip frequency region, a second flux saturation region, and a third voltage saturation region; and means for commanding the means for varying in the first fixed slip frequency region of operation with an excitation frequency command signal derived from the machine rotor speed and unconstrained maximum efficiency slip frequency, and an excitation voltage/current command signal derived from the difference between the commanded torque/speed of the machine and its actual torque/speed; in the second flux saturation region of operation with an excitation frequency command signal derived from the machine rotor speed and slip frequency command signal derived from the machine rotor speed and slip frequency which is a function of the difference between the commanded torque/speed of the machine and its actual torque/speed; and an excitation voltage/current command signal derived from the difference between the saturation flux and actual flux in the machine; and in the third voltage saturation region of operation with the saturation voltage and an excitation frequency command signal derived from the machine rotor speed and slip frequency which is a function of the difference between the commanded torque/speed and actual torque/speed of the machine.

3 Claims, 12 Drawing Figures 4,392,100

OPTIMUM EFFICIENCY CONTROL SYSTEM

FIELD OF INVENTION

This invention relates to an optimum efficiency control system and method for a variable torque/speed rotary a.c. induction machine, and more particularly to such a system and method in which optimum efficiency is attained by selective variation of the slip frequency as well as the voltage/current.

BACKGROUND OF INVENTION

Variable/torque speed a.c. induction machines (motors and generators) are generally, conventionally controlled according to one of two strategies. One strategy uses a fixed slip frequency selected to provide maximum torque at maximum voltage and varies the voltage in order to obtain variations in the torque/speed. The system is simple and fairly effective, but suffers from low efficiencies, especially at torques other than the maximum torque obtainable at the selected slip frequency. The second strategy varies the slip frequency proportionally to the required torque in order to attempt to emulate a constant saturation flux operation of the machine. At high torques this approach provides reasonable efficiencies, but at lower torques, due to the efficiency characteristics of the motor, the efficiency is poor. In addition the second strategy does not permit operation of the machine above its rated speed.

SUMMARY OF INVENTION

It is therefore a primary object of this invention to provide a control system and method which provides optimum efficiency throughout the full torque/speed range of an a.c. induction machine.

It is a further object of this invention to provide such a method and system which achieves maximum torque capability of an a.c. induction machine at a maximum possible efficiency over the full speed range of the motor.

It is a further object of this invention to provide such a method and system which achieves minimum machine size for a given torque capability and efficiency.

It is a further object of this invention to provide such a method and system which results in increased torque at high speeds.

The invention results from the realization that neither the slip frequency nor any other parameter need be fixed or constrained in any way to obtain optimum efficiency at any torque and to obtain maximum torque throughout the full speed range of an a.c. induction machine, but rather efficiency may be optimized by permitting variations as necessary in the slip frequency and in the voltage or current to achieve fully efficient operation within the physical limitations of the system, e.g. saturation flux, voltage and current.

The invention features an optimum efficiency control system for a variable torque/speed rotary a.c. induction machine. There are means for varying the frequency and magnitude of the excitation voltage/current supplied to the machine in three optimum efficiency regions of operation. There is a first fixed slip frequency region, a second flux saturation region, and a third voltage saturation region. There are means for commanding the means for varying in the first fixed slip frequency region of operation with an excitation frequency command signal derived from the machine rotor speed and unconstrained maximum efficiency slip frequency. In this first region there is also provided an excitation voltage/current command signal derived from the difference between commanded torque/speed of the machine and its actual torque/speed; in the second flux saturation region of operation there is provided an excitation frequency command signal derived from the machine rotor speed and the slip frequency which in turn is a function of the difference between the command torque/speed of the machine and its actual torque/speed. Also provided in the second region is an excitation voltage/current command signal derived from the difference between the saturation flux and actual flux in the machine. In the third voltage saturation region of operation, there is provided the saturation voltage, and also an excitation frequency command signal derived from the machine rotor speed and slip frequency, which in turn is a function of the difference between the commanded torque/speed and actual torque/speed of the machine.

In one embodiment the means for commanding may include storage means for storing a table of values of frequency and magnitude of excitation voltage/current in each of the three regions over the torque/speed range of the machine.

In another embodiment the means for commanding may include means for generating a torque/speed error signal corresponding to a difference between the commanded torque/speed and actual torque/speed of the machine. There is means for supplying the unconstrained maximum efficiency slip frequency and means for generating a flux error signal corresponding to the difference between the actual flux and the saturation flux of the machine. First means converts to a voltage/current command signal the torque/speed error signal in the first region. Second means converts the flux error signal to a voltage/current command signal in the second region; third means converts to a slip frequency adjustment signal the torque/speed error signal in the second and third regions. There are means for combining the actual machine speed with the unconstrained maximum efficiency slip frequency in the first region and with the slip frequency adjustment signal to the second and third regions to produce an excitation frequency command signal. Finally, means are provided for supplying the saturation voltage in the third region.

The system may also include means for determining in which of the three regions the machine is operating, and switching means for connecting, to the means for varying, the voltage/current command signal from the first means for converting in the first region, and the voltage/current command signal from the second means for converting in the second region, and the saturation voltage from the means for supplying in the third region. The switching means also connects to the means for combining the unconstrained maximum efficiency slip frequency in the first region and slip frequency adjustment signal in the second and third regions.

The invention also includes an optimum efficiency method for controlling a variable torque/speed rotary a.c. induction machine, including generating an excitation frequency command signal derived from the machine rotor speed and unconstrained maximum efficiency slip frequency, and generating an excitation voltage/current command signal derived from the difference between commanded torque/speed of the machine and its actual torque/speed in the first region. In the second region there is generated an excitation frequency command signal derived from the machine rotor speed and slip frequency which is a function of the difference between the commanded torque/speed of the machine and its actual torque speed, and for generating excitation voltage/current command signal derived from the difference between the saturation flux and actual flux in the machine. In the third voltage saturation region the saturation voltage is provided and there is generated an excitation frequency command signal derived from the machine rotor speed and slip frequency which is a function of the difference between the commanded torque/speed and the actual torque/speed of the machine.

DISCLOSURE OF PREFERRED EMBODIMENT

Other objects, features and advantages will occur from the following description of a preferred embodiment and the accompanying drawings, in which.

Figure 1:
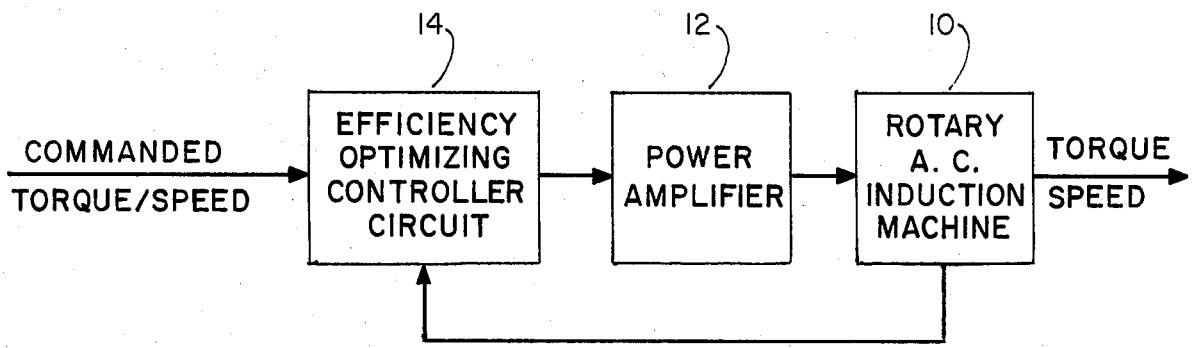
FIG. 1 is a block diagram of an optimum efficiency control system according to this invention.

There is shown in FIG. 1 a rotary a.c. induction machine 10 whose excitation voltage/current is controlled by a power amplifier 12 under the direction of efficiency optimizing controller circuit 14. Circuit 14 receives a commanded torque or speed at its input and determines the necessary frequency and magnitude of the excitation voltage/current to be provided to machine 10 to produce the commanded torque or speed. Either the torque or the speed may be commanded at the input to circuit 14. Rotary machine 10 may be either a motor or a generator.

Figure 2:
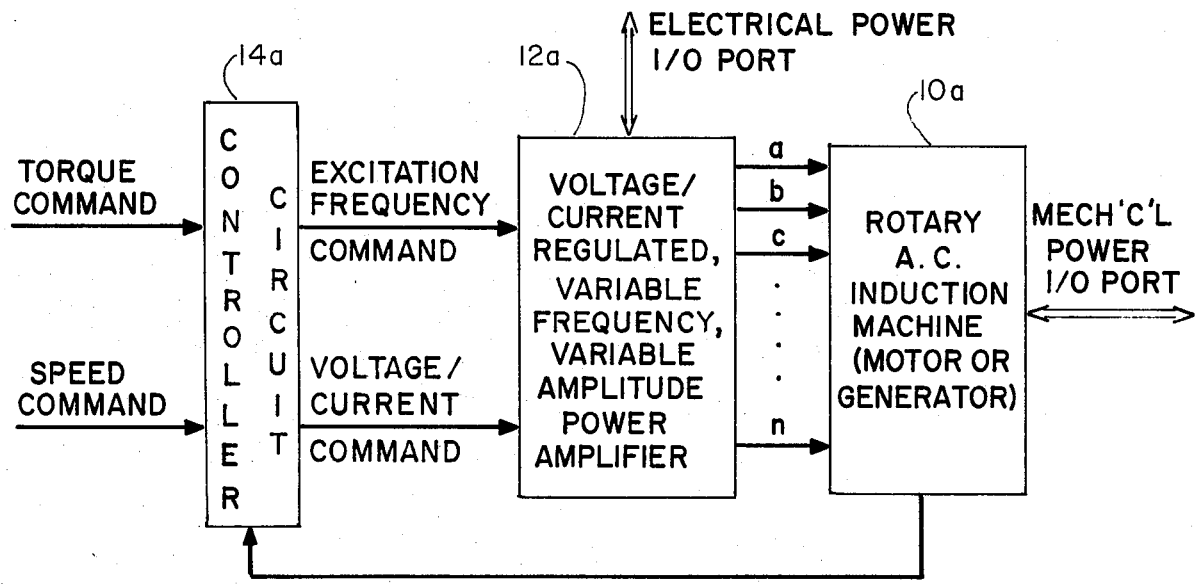
FIG. 2 is a more detailed block diagram of the system of FIG. 1.

In FIG. 2 and subsequent figures, like parts are given like numbers accompanied by a lower case letter. As shown in FIG. 2, controller circuit 14a may receive either a torque command or a speed command or both. Either or both may be external commands, such as introduced by the accelerator pedal on an electric motor vehicle, or one may be such an external command and the other may be simply the actual torque or speed of motor/generator 10a. Since torque and speed are not independent variables for a fixed load line, external command of both torque and speed must necessarily be for an open loop controller. Controller circuit 14a generates the excitation frequency command and voltage/current command to power amplifier 12a, which is a voltage/current regulated variable frequency, variable amplitude power amplifier. It may be a linear amplifier or a motor-generator set. Various devices are taught in the prior art:

(1) A. Schonng and H. Stemmler, "Static Frequency Changers With 'Subharmonic' Control in Conjunction With Reversible Variable Speed Drive," Brown Boveri Review, 1964;

(2) J. Zubek et al., "Pulse Width Modulated Inverter Motor Drives With Improved Modulation," IEEE Transactions on Industry Applications, Vol. 1A-11, No. 6, Nov./Dec. 1975.

Power amplifier 12a then develops one or more, a,b, . . . n, drive voltage or current outputs of the proper frequency and magnitude to drive the a,b, . . . n phases of motor/generator 10a.

Figure 3:
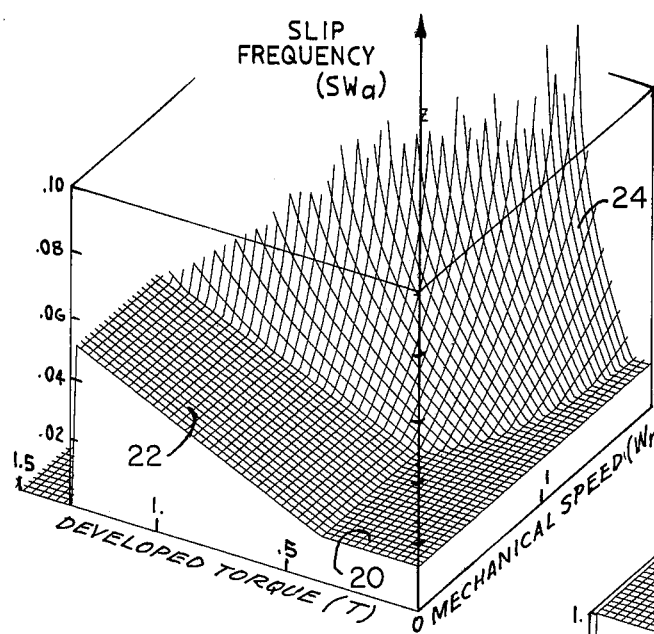
FIG. 3 is a three-dimensional plot of torque versus speed versus slip frequency for optimum efficiency performance of a rotary induction machine showing the three optimum efficiency regions of operation and the constant slip frequency characteristic of the fixed slip frequency region.
Figure 4:
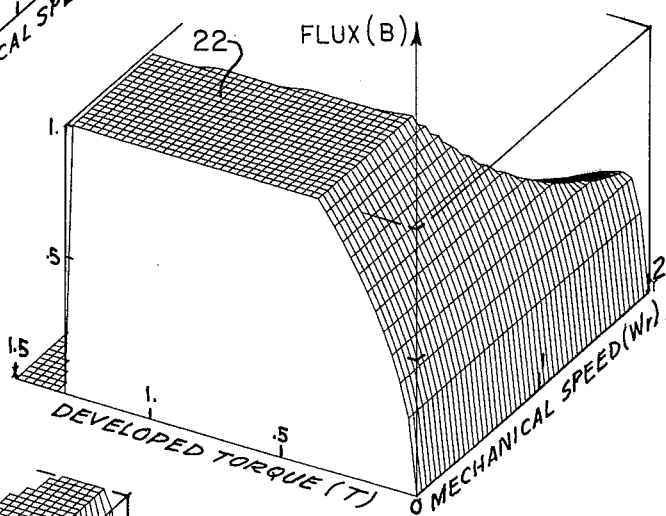
FIG. 4 is a three-dimensional plot of torque versus speed versus flux density for optimum efficiency performance of a rotary induction machine, illustrating to advantage the constant saturated or maximum flux region of operation.
Figure 5:
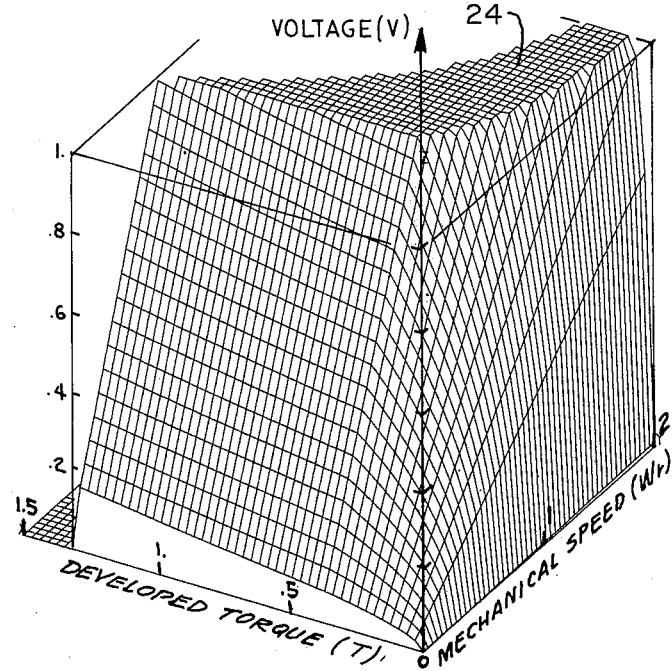
FIG. 5 is a three-dimensional plot of torque versus speed versus voltage for optimum efficiency performance of a rotary induction machine, showing to advantage the constant saturated or maximum voltage region of operation.

According to the invention, the slip frequency is not fixed or constrained. Rather, the efficiency of the machine is optimized by permitting variation of the slip frequency and of the voltage/current to achieve the optimum efficiency within the physical limitations of the system, e.g. saturation flux, saturation voltage and current. The optimization of efficiency over the full torque/speed range of the machine by varying the slip frequency and voltage or current has revealed that rotary a.c. induction machines operate in three torque and speed regions. In the first region, corresponding to low torque output, slip frequency is constant. In the second region, corresponding to high torque at up to rated speed of the machine, the flux is constant at saturation; and in the third region, corresponding to high torque levels above rated speed, voltage is constant at the saturation level. That this is so may be seen from FIG. 3, which is a three-dimensional depiction of the optimum efficiency points of operation for a rotary a.c. induction machine where developed torque (T), normalized with respect to rated torque, is plotted against mechanical speed ($w_r$), normalized with respect to the rated electrical frequency of a two-pole machine, versus slip frequency ($sw_a$), normalized with respect to the rated electrical frequency of a two-pole machine. In FIG. 3 it is apparent that a first region 20 of optimum efficiency performance occurs at low torque values; a second constant maximum or saturated flux region 22 occurs at high torque levels up to rated speed; and a third constant maximum or saturated voltage region 24 occurs at high torque above rated speed values. The maximum or saturated flux region 22 may be seen to greater advantage in FIG. 4, where there is shown a three-dimensional plot of torque versus speed versus flux or flux density (B), normalized with respect to the rated flux of the machine. The constant maximum or saturated voltage, region 24, may be seen to greater advantage in FIG. 5 where there is shown a three-dimensional plot of developed torque versus mechanical speed versus voltage (V), where voltage is normalized with respect to the rated voltage of the machine. Further discussion of the theories underlying the invention may be found in The Charles Stark Draper Laboratory, Inc., Report T-716, "Optimum Efficiency Performance of a Constrained Polyphase Induction Motor," by Robert Duncan Drescher, August 1980, Master of Science Thesis, Massachusetts Institute of Technology, and in Volume I, The Fourteenth Intersociety Energy Conversion Engineering Conference, Aug. 5–10, 1979, page 627 et. seq., "A High Efficiency Controlled Slip Induction Motor Drive for Electric Vehicles," Eisenhaure, Stanton and Drescher.

Figure 6:
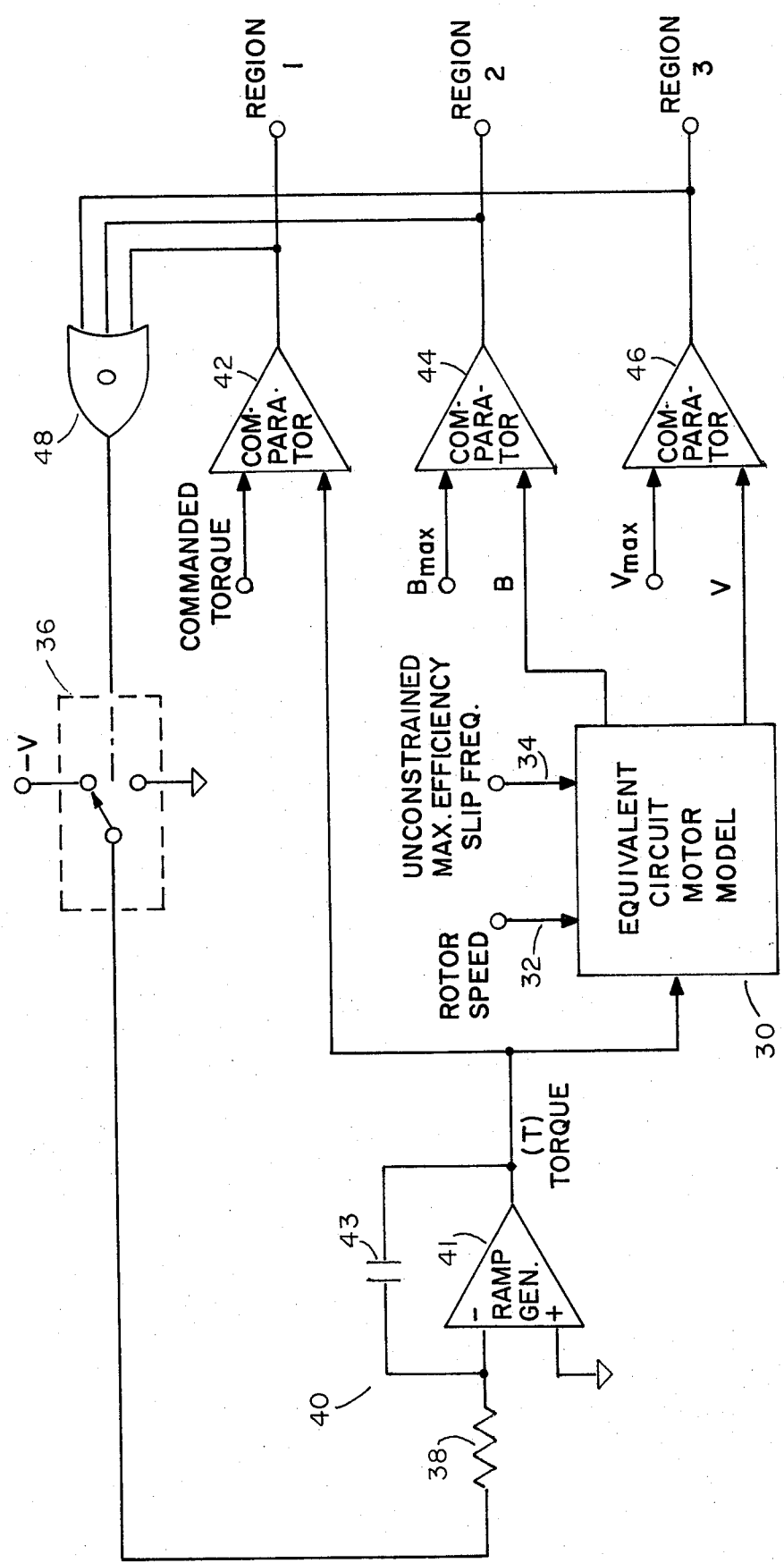
FIG. 6 is a block diagram of one portion of one embodiment of the controller circuit of FIG. 2 which determines in which of the three regions a rotary a.c. induction machine is operating.

Controller 14 may determine in which region operation occurs, by means of the circuit of FIG. 6. The equivalent circuit motor model 30, FIG. 6, is provided with the rotor speed on line 32 and unconstrained maximum efficiency slip frequency on line 34. Switch 36 is closed on negative voltage which is applied through resistor 38 to ramp generator 40 which includes operational amplifier 41 and capacitor 43. The ramp output from generator 40 represents torque to motor model 30 and to comparator 42. Comparator 44 receives the flux B from motor model 30 on one input and at its other input receives the maximum or saturated flux value $B_{max}$. B may represent either flux or flux density in this case since the flux density and the flux do not differ in fixed geometry. machines. Comparator 46 is provided with the voltage from motor model 30 at one input and at the other input the saturation or maximum voltage $V_{max}$. As the ramp output continues, either the torque exceeds the commanded torque, causing comparator 42 to provide an output, or the flux B exceeds the saturation flux $B_{max}$, causing comparator 44 to provide an output, or the voltage exceeds the saturation voltage $V_{max}$, causing comparator 46 to provide an output. The comparator that first provides an output indicates the region in which the optimum efficiency performance of the motor occurs, and also through OR gate 48 operates switch 36 to connect resistor 38 to ground and cease operation of ramp generator 40.

Figure 7:
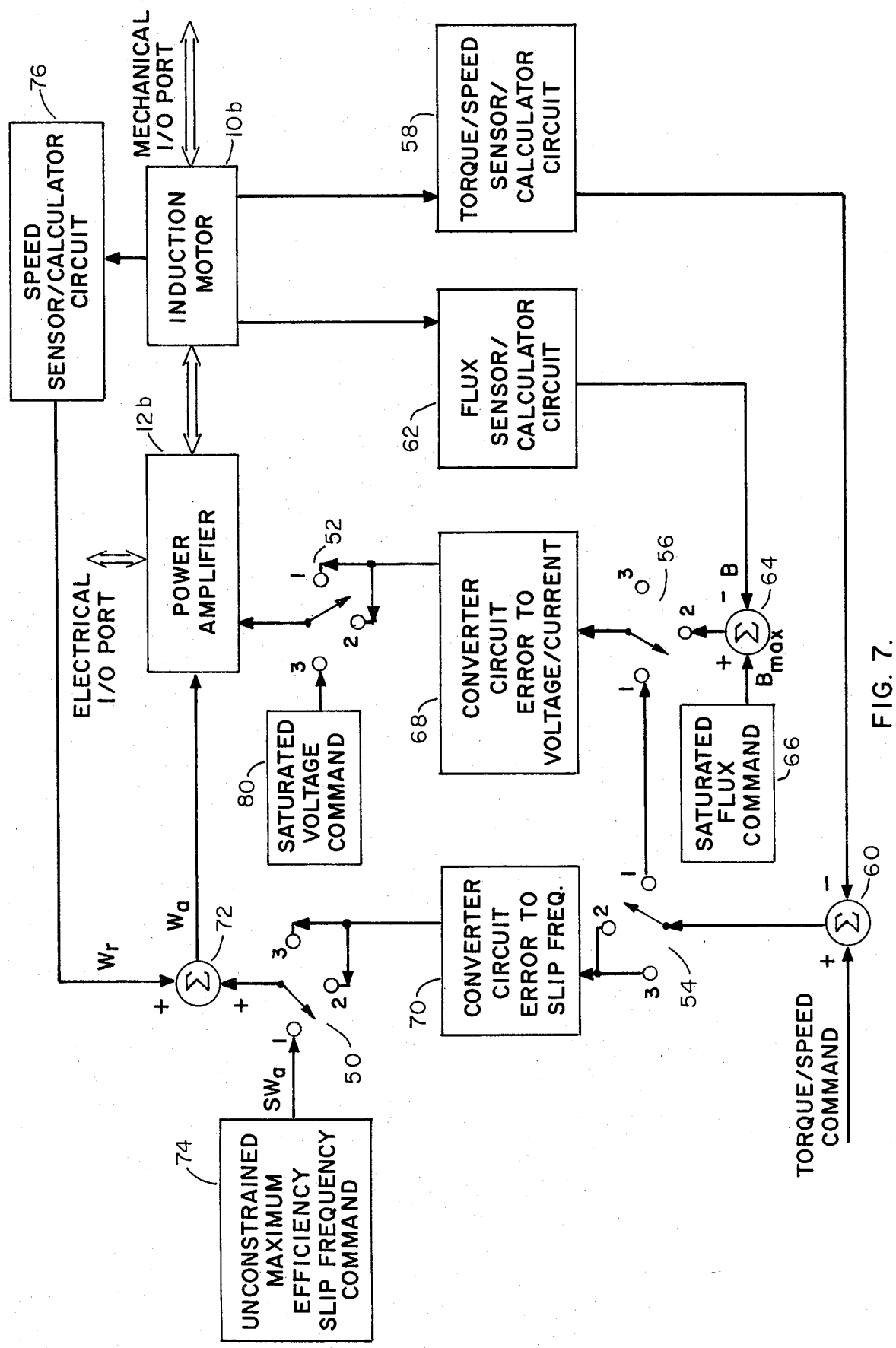
FIG. 7 is a block diagram of another part of the controller circuit of FIG. 2 which provides the frequency and magnitude of the excitation voltage/current commands to the power amplifier.

Switches 50, 52, 54, 56, FIG. 7, are set to their positions 1, 2, or 3, depending upon which region 1, 2, or 3, was indicated by the circuit in FIG. 6. In FIG. 7 circuit 58 either directly senses or calculates from other parameters the torque/speed of induction motor 10b and provides that as one input to summer circuit 60, the other input of which is the corresponding torque or speed command from some external source. Circuit 62 senses directly or calculates from other parameters the flux in motor 10b and provides that as one input to summer 64, the other input of which is the maximum flux from a saturated flux command 66, which may be simply a voltage reference indicative of maximum flux. Converter circuit 68 converts an error in either the torque/speed summer 60 or the flux summer 64 to a voltage or current command for power amplifier 12b through contacts 1 and 2 of switch 52. Converter circuit 70 converts torque or speed errors from summer 60 to slip frequency commands for summer 72 through contacts 2 and 3 of switch 50. Summer 72 combines either the unconstrained maximum efficiency slip frequency provided by command 74, which could be simply a source of voltage indicative of the maximum efficiency slip frequency, at contact 1 of switch 50, or the slip frequency command on contacts 2 and 3 from converter circuit 70, with the actual rotor speed of motor 10b which has been sensed or calculated by circuit 76. The maximum or saturated voltage is provided by command 80 to contact 3 of switch 52. The maximum or saturated voltage and the maximum or saturated flux or flux density, as well as the unconstrained maximum efficiency slip frequency, are obtained from the motor or generator specifications, and/or supply limitations, and the torque or speed commands are provided from an external source seeking to control the motor.

With operation in region 1, switches 50, 52, 54, 56, are all set to contact 1. Thus the unconstrained maximum efficiency slip frequency is combined in summer 72 with the rotor frequency to provide the necessary excitation frequency commands to power amplifier 12b. Summer 60 provides torque or speed error to contact 1 of switch 54, which in turn is connected to contact 1 of switch 56, so the torque/speed error is provided to converter circuit 68 which provides a voltage or current command through contact 1 of switch 52 to power amplifier 12b. In region 2, summer 72 is connected to contact 2 of switch 50, receiving the slip frequency command from converter circuit 70 which has generated that command in response to the torque or speed error signal provided by summer 60 through contact 2 of switch 54. The flux error signal developed by summer 64 is provided through contact 2 in switch 56 to converter circuit 68 which generates a voltage or current command for power amplifier 12b through contact 2 of switch 52.

In region 3, summer 72 once again receives the output of converter 70, this time through contact 3 of switch 50, and converter circuit 70 once again receives the output of summer 60 but this time through contact 3 of switch 54. In position 3 converter circuit 68 receives no input and power amplifier 12b receives the maximum or saturated voltage command from saturated voltage command 80 through contact 3 of switch 52.

Figure 8:
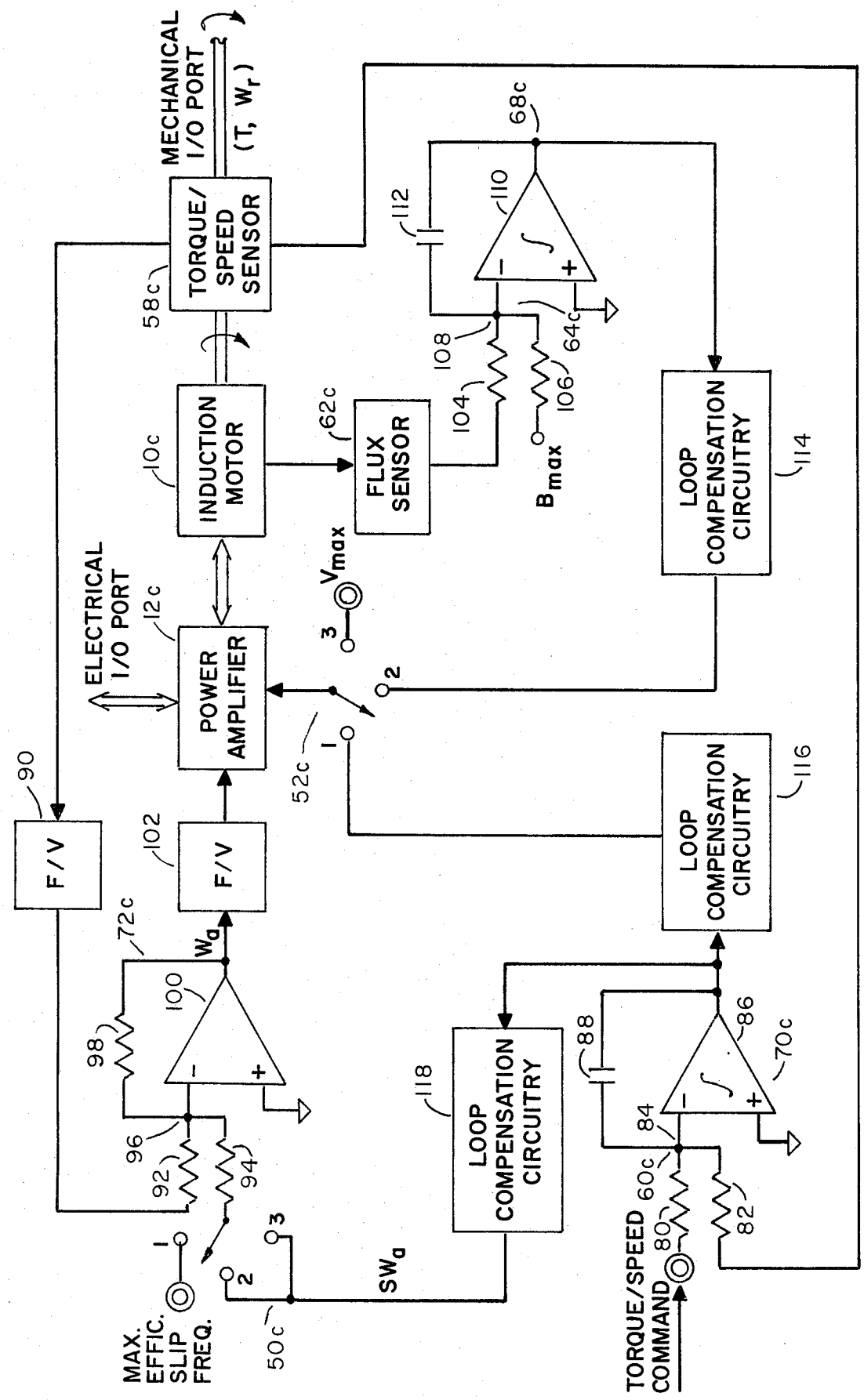
FIG. 8 is a schematic block diagram of an alternative construction for the circuit shown in FIG. 7 assuming integral control.

Although in FIG. 7 the system is serving an induction motor 10b, this is not a necessary limitation of the invention. As indicated previously, the machine 10 may be an induction generator, and in that case the circuit would operate in the same fashion except that the slip frequency would have the opposite sign. A variation in the circuit of FIG. 7 is shown in FIG. 8, where the torque/speed sensor or calculator is implemented by a torque/speed sensor 58c that provides one output to summer circuit 60c which includes resistors 80, 82, and junction point 84. Summer 60c provides an input directly to converter circuit 70c which includes integrator circuit 86 with capacitor 88. The other speed output of sensor 58c is delivered through a frequency-to-voltage converter 90 to summer 72c, which includes resistors 92, 94, junction point 96, resistor 98, and operational amplifier 100, the output of which is fed to a voltage-to-frequency converter 102. Voltage-to-frequency converter 102 may be actually included in power amplifier 12c, and frequency-to-voltage converter 90 may be included in torque/speed sensor 58c, or sensor 58c may provide directly a voltage instead of frequency. The flux sensing and calculating circuit 62 is implemented by a specific flux sensor 62c that provides an output to summer 64c which includes resistors 104, 106, and junction point 108, whose output is delivered to integrator 110 which includes capacitor 112. Loop compensation circuits 114, 116, and 118 are provided to enhance stability.

Figure 9:
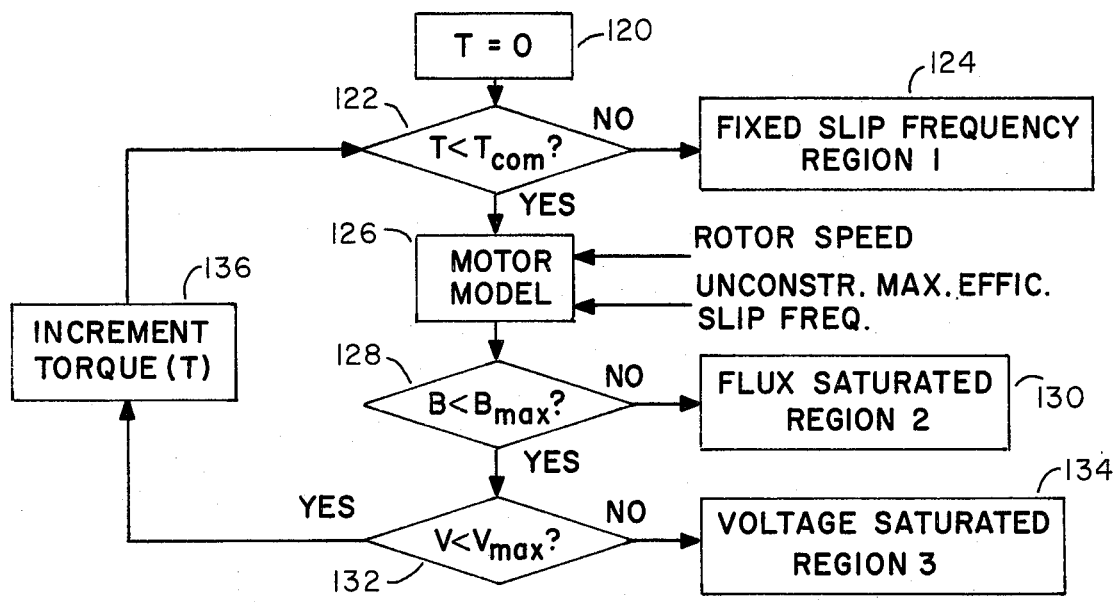
FIG. 9 is a flow chart showing a method of determining in which region a rotary a.c. induction machine is operating according to this invention.

The method according to this invention of determining in which region the machine is operating is illustrated in FIG. 9, where initially a signal representing a torque of zero, 120, is introduced and a comparison 122 is made to determine whether the commanded torque is greater than the torque represented by the signal. If it is not, the decision is made that operation is occurring in fixed slip frequency region 1, 124. If the commanded torque is greater than the signal torque, then the torque is supplied to the motor model 126, which is also supplied with rotor speed and the unconstrained maximum efficiency slip frequency for the motor. Flux B is generated from the motor model and the inquiry is next made as to whether the flux maximum is greater than the motor flux 128. If not, the decision is made that the motor is operating in the flux saturated region 130. If the flux maximum is greater than the actual flux, when the comparison is made between the actual voltage and the maximum voltage. If the actual voltage is greater the determination is made, 134, that the machine is operating in the voltage saturated region 3. If not, the torque signal is incremented, 136, and the cycle begins again in step 122.

Figure 10:
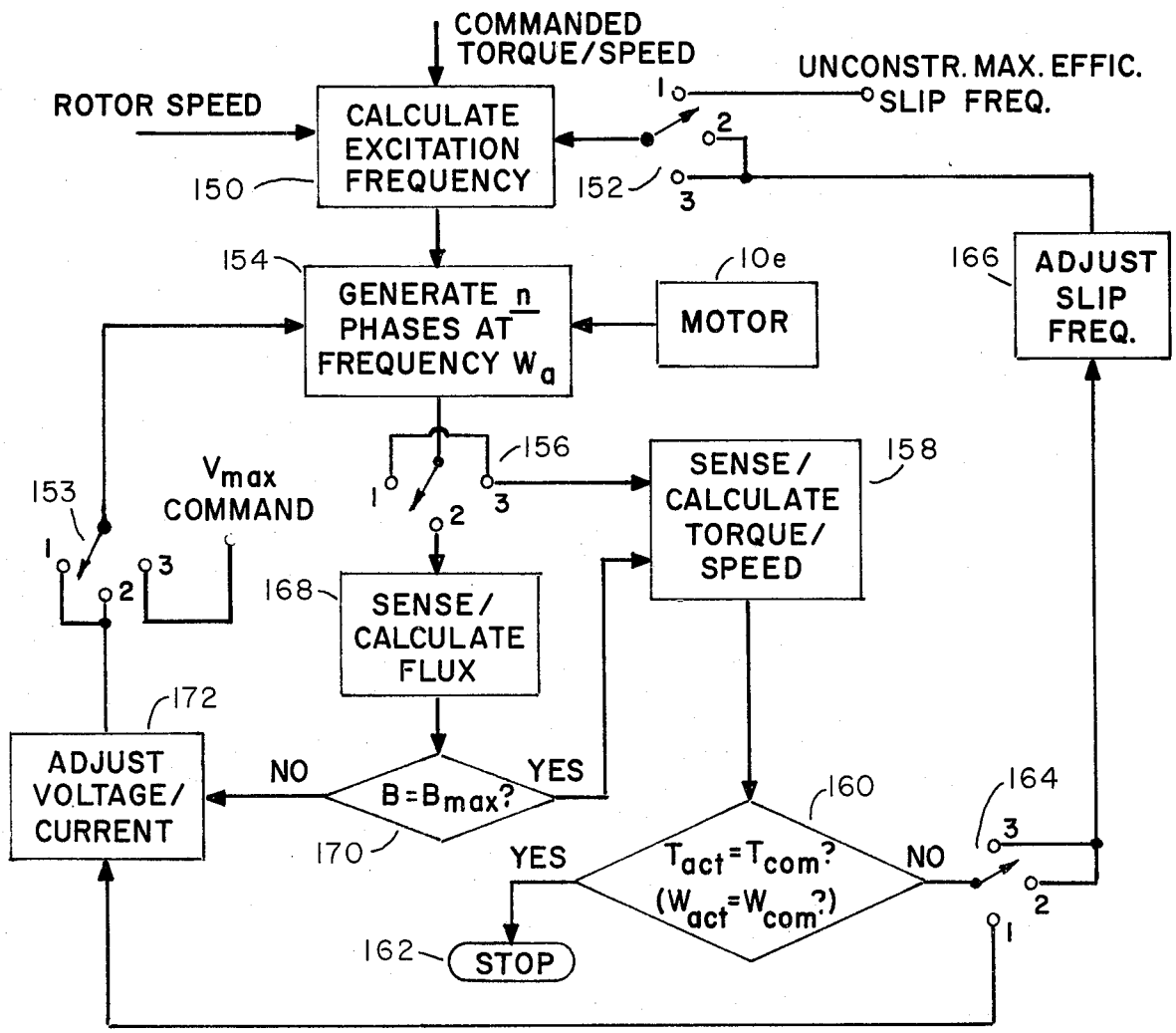
FIG. 10 is a flow chart showing the generation of the proper frequency and magnitude of the excitation voltage/current.

After the determination has been made in FIG. 9 of the region in which the motor operation occurs, the switches in FIG. 10 are set. The slip frequency is combined with the actual rotor speed, and the excitation frequency is calculated, 150. The slip frequency provided from switch 152 is either the unconstrained maximum efficiency slip frequency if the switch is in position 1, or an adjusted slip frequency if the slip is in positions 2 or 3. From the excitation frequency there is generated, 154, the n phases at the frequency and voltage of current magnitude required to obtain the commanded torque or speed. In positions 1 or 3, switch 156, the torque or speed is calculated, 158, and a comparison is made as to whether the commanded torque is equal to the actual torque or the commanded speed is equal to the actual speed, 160. If it is, the cycle stops, 162. If it is not, and the operation is occurring in region 2 or 3, then an adjusted slip frequency is provided, 166, and delivered to contacts 2 and 3 of switch 152 or if in region 1, switch 164 in position 1, voltage/current is adjusted until actual torque or speed equals commanded torque or speed. If operation is occurring in region 2, then through contact 2 of switch 156 the flux is sensed or calculated, 168, and compared to the flux maximum 170. If the maximum flux is equal to the sensed flux then step 158 follows. If it is not, the voltage is adjusted, 172, at step 154 through contact 2 of switch 153. In region 3, switch 153 is connected to contact 3 and the saturated voltage command is provided to step 154.

Figure 11:
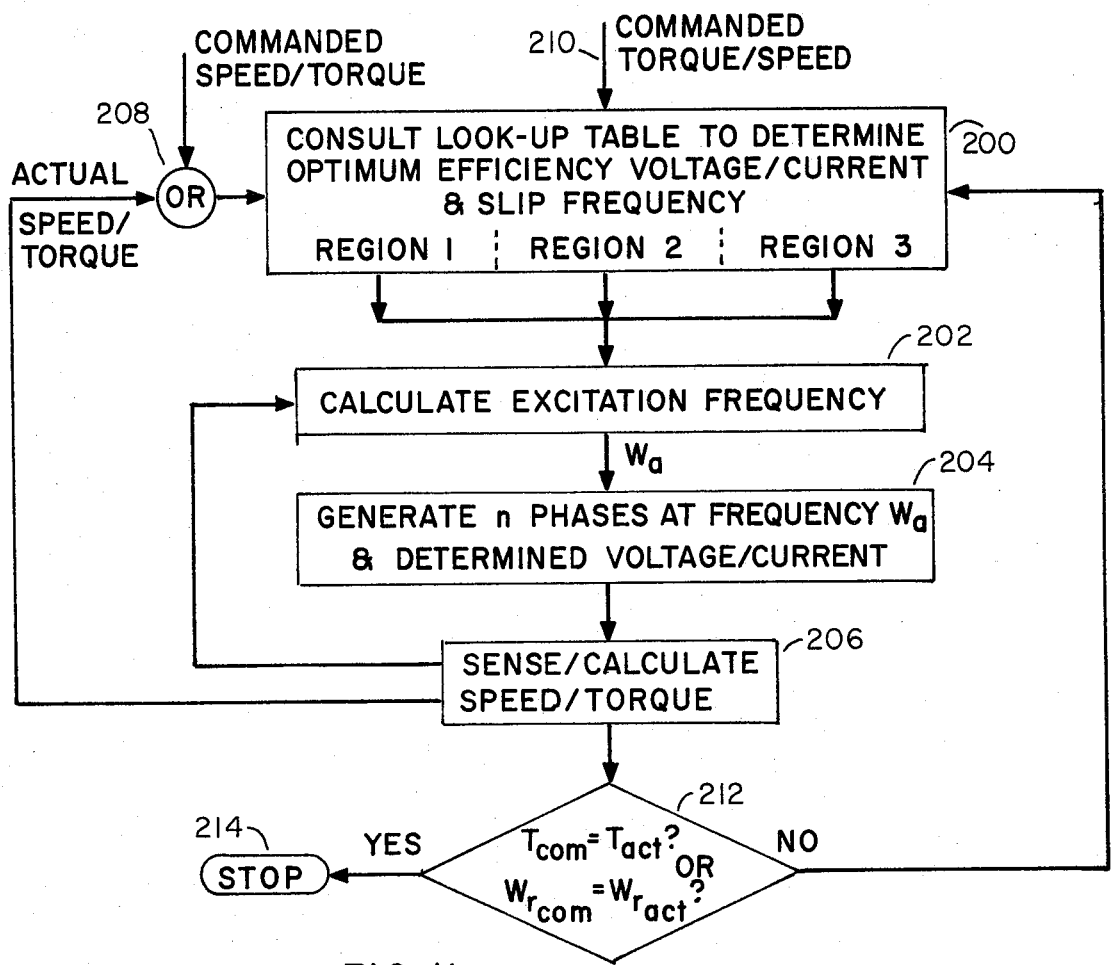
FIG. 11 is a flow chart of an alternative approach according to this invention for generating the frequency and magnitude of the excitation voltage/current according to this invention.

Although thus far a real time system has been illustrated for controlling machine operation with optimum efficiency, this is not a necessary limitation of the invention. For example, as shown in FIG. 11, a commanded torque and speed, or commanded torque and actual speed, or commanded speed and actual torque, is provided to look-up table 200 which determines the optimum voltage or current and slip frequency for that particular combination of torque and speed, from all of the possible combinations stored. The look-up automatically results in the response in the correct region. Slip frequency is combined with the actual speed to determine the excitation frequency, 202, which is then used in combination with the voltage or current, also found from the table, to generate the n phases at the determined excitation frequency and voltage or current magnitude, 204. The speed or torque is sensed or calculated, 206. The actual speed sensed is provided to step 202 while the speed or torque, whichever is required, is provided to an OR input 208, which may take either the actual speed or torque or the commanded speed or torque to complement the commanded torque or speed at input 210. If the commanded torque is equal to the actual torque, or the commanded speed is equal to the actual speed, 212, the cycle stops, 214. If not the cycle returns to step 200.

The specific slip frequency and voltage/current excitation values for the look-up table are calculated with a numerical optimization procedure. The equation for the motor efficiency is maximized at given values of torque and speed subject to the constraints (1) that the motor voltage is less than or equal to the maximum allowable voltage; (2) the motor current is less than or equal to the maximum allowable current; and (3) the motor flux or flux density is less than or equal to the motor saturation flux or flux density. Mathematically, the problem may be stated as:

Maximize:

$$\eta = \frac{p\omega_r}{p\omega_r + s\omega_a + R_r R_s (s\omega_a)^{-1} M^{-2} \{1 + (s\omega_a)^2 L_r^2 R_r^{-2}\}} \quad (6.4)$$

Subject to:

$$\bar{\tau} - \left| \frac{\hat{z}_m}{\hat{z}_s(\hat{z}_m + \hat{z}_r) + \hat{z}_m \hat{z}_r} \right|^2 \frac{p V_s^2 R_r}{s\omega_a} = 0 \quad (6.5a)$$

$$\bar{\omega}_r - \omega_r = 0 \quad (6.5b)$$

$$V_{max} - V_s \geq 0 \quad (6.5c)$$

$$I_{max} - \left| \frac{\hat{z}_m + \hat{z}_r}{\hat{z}_s(\hat{z}_m + \hat{z}_r) + \hat{z}_m \hat{z}_r} \right| V_s \geq 0 \quad (6.5d)$$

$$I_{m,max} - \left| \frac{\hat{z}_r}{\hat{z}_s(\hat{z}_m + \hat{z}_r) + \hat{z}_m \hat{z}_r} \right| V_s \geq 0 \quad (6.5e)$$

where:

$$\hat{z}_s = R_s + j(s\omega_a + p\omega_r)(L_s - M)$$

$$\hat{z}_r = R_r(s\omega_a + p\omega_r)/s\omega_a + j(s\omega_a + p\omega_r)(L_r - M)$$

$$\hat{z}_m = j(s\omega_a + p\omega_r) M$$

A full discussion of the variables is set forth in Charles Stark Draper Laboratory, Inc., Technical Report T-216, indentified more fully, supra., and that entire document is incorporated here by reference.

These equations can be solved with a Fibonacci univariate search algorithm in order to determine the optimum excitation values at the given torque and speed point. The look-up table is then filled in by solving the above equations for each torque and speed operating point. These values may be displayed as in the graphs in FIGS. 3, 4, and 5, and are actually the points that are generated as the system of FIGS. 7 and 8, for example, operate in a real time mode.

Figure 12:
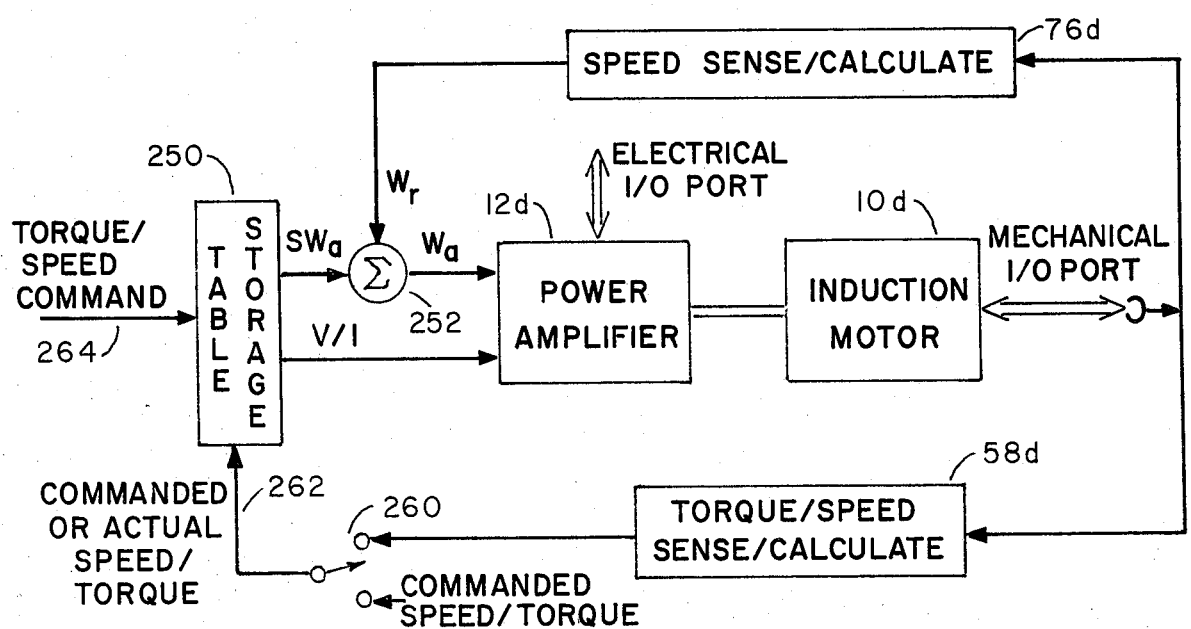
FIG. 12 is a block diagram of a system showing one implementation of the method of FIG. 11.

An implementation of the look-up table approach includes a storage table 250, FIG. 12, which responds to a particular torque or speed command and a complementary input of a commanded or actual speed or torque to provide the specific slip frequency command to summer 252 and the specific voltage or current command to power amplifier 12d. Summer 252 combines the specific slip frequency read out of storage 250 with the actual rotor speed sensed by the speed sensor/calculator 76d to provide the actual excitation frequency command to power amplifier 12d. Circuit 58d senses or calculates the torque or the speed and delivers it to one contact of switch 260. The other contact may be fed directly with a commanded speed or torque to provide the necessary complementary input on line 262 to the torque/speed command input on line 264.

Other embodiments will occur to those skilled in the art and are within the following claims:

What is claimed is:

1. An optimum efficiency control system for a variable torque/speed rotary a.c. induction machine comprising:

means for indicating a first fixed slip region in response to the torque exceeding commanded torque;
    means for indicating a second flux saturation region in response to the flux exceeding the saturation flux;
    means for indicating a third voltage saturation region in response to the voltage exceeding the saturation voltage;
    means, responsive to said means for indicating said first fixed slip region, for commanding an excitation frequency as a function of the rotor speed and unconstrained maximum efficiency slip and for commanding an excitation voltage/current as a function of the actual torque/speed and commanded torque/speed; responsive to said means for indicating said second flux saturation region, for commanding an excitation frequency as a function of the rotor speed and slip frequency, and for commanding an excitation voltage/current as a function of the actual flux and the saturation flux; and response to said means for indicating said third voltage saturation region for commanding a saturation voltage as a function of rotor speed and for commanding excitation frequency as a function of slip frequency; and
    means responsive to said means for commanding, for varying the frequency and magnitude of the excitation voltage/current supplied to the machine in the three regions of operation.

2. The system of claim 1 in which said means for commanding includes storage means for storing a table of values of frequency and magnitude of excitation voltage/current in each of the three regions over the torque and speed range of the machine.

3. A method of controlling with optimum efficiency a variable torque/speed rotary a.c. induction machine by varying the frequency and magnitude of the excitation voltage/current supplied to the machine in three optimum efficiency regions of operation, including: a first fixed slip frequency region, a second flux saturation region, and a third voltage saturation region, comprising:

indicating the first fixed slip region in response to the torque exceeding commanded torque;
    indicating the second flux saturation region in response to the flux exceeding the saturation flux;
    indicating the third voltage saturation region in response to the voltage exceeding the saturation voltage;
    commanding, in response to an indication of the first fixed slip region, an excitation frequency as a function of the rotor speed and unconstrained maximum efficiency slip and an excitation voltage/current as a function of the actual torque/speed and commanded torque/speed;
    commanding, in response to an indication of the second flux saturation region, an excitation frequency as a function of the rotor speed and slip frequency and an excitation voltage/current as a function of the actual flux in the saturation flux;
    commanding, in response to an indication of the third voltage saturation region, a saturation voltage as a function of rotor speed and excitation frequency as a function of slip frequency; and
    varying, in response to those commands, the frequency and magnitude of the excitation voltage/current supplied to the machine in the three regions of operation.

* * * * *